United States Patent Office 3,309,411
Patented Mar. 14, 1967

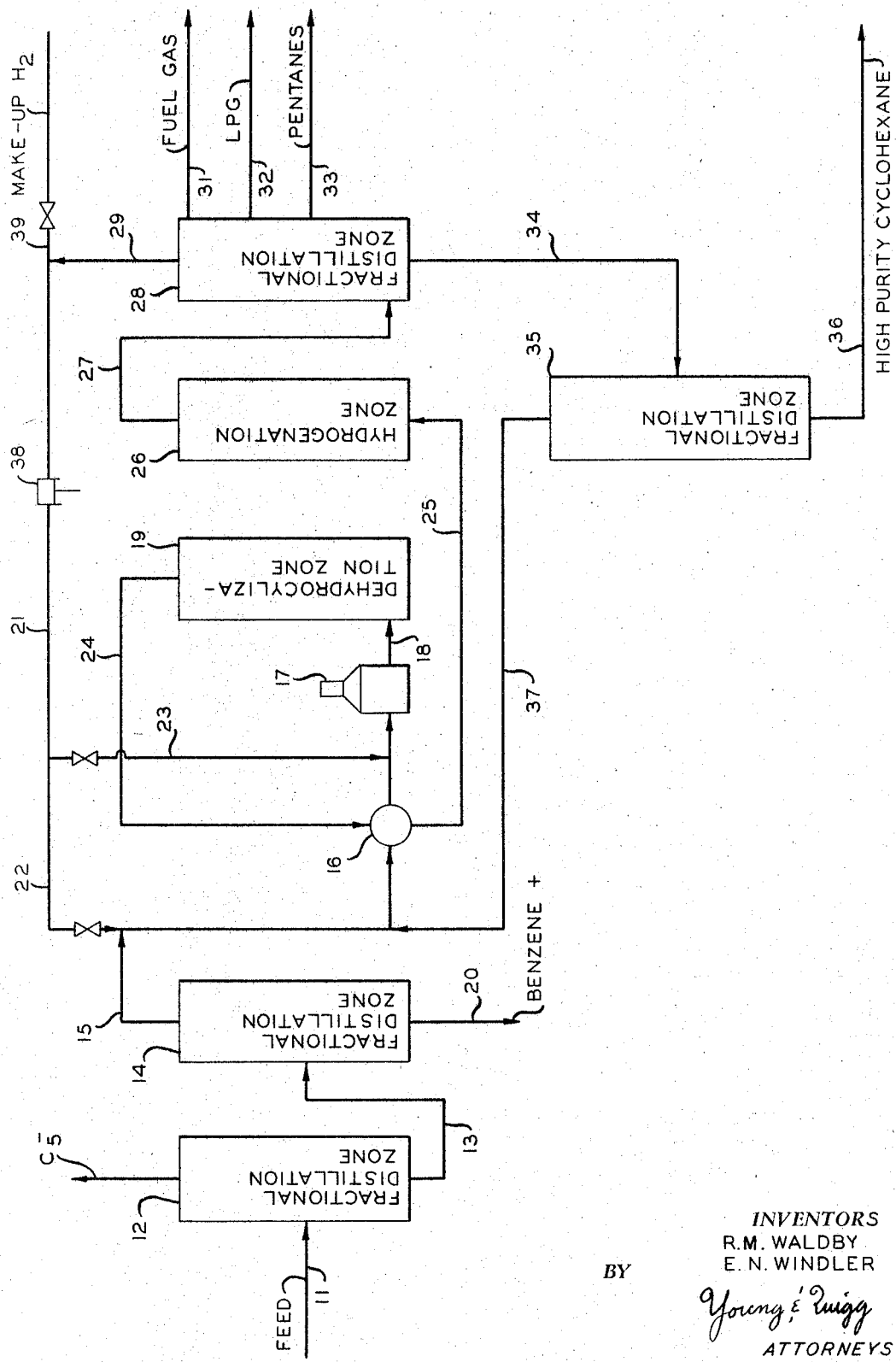

3,309,411
PROCESS FOR THE PRODUCTION OF HIGH
PURITY CYCLOHEXANE
Roy M. Waldby, New York, N.Y., and Edwin N. Windler, Sweeny, Tex., assignors to Phillips Petroleum Company, a corporation of Delaware
Filed Dec. 14, 1964, Ser. No. 417,980
5 Claims. (Cl. 260—666)

This invention relates to an improved process for the production of a high purity cyclohexane product stream. In one aspect the invention relates to a novel and improved process for the production of a high purity cyclohexane product stream from a feed stream containing components having boiling points closely adjacent the boiling point of cyclohexane without the necessity of solvent extraction. In another aspect the invention relates to a process for producing 99.9 volume percent purity cyclohexane from a feed stream containing 2,2-dimethylpentane and 2,4-dimethylpentane.

Many processes, for example the production of synthetic fibers such as polyamides, require the utilization of cyclohexane of extremely high purity. However the straight run distillate which is normally used as a feedstock for the production of cyclohexane contains other materials, principally 2,2-dimethylpentane and 2,4-dimethylpentane, which have a boiling point substantially the same as that of cyclohexane, rendering the purification of the cyclohexane product stream extremely difficult. The extremely narrow temperature differential between the boiling point of cyclohexane and that of 2,2-dimethylpentane and 2,4-dimethylpentane render fractionation extremely difficult if not commercially unfeasible. Resort has been made to solvent extraction as a means for separating impurities from the cyclohexane product stream. However solvent extraction has been found to be a very expensive operation. Accordingly it has become desirable to find a process which can produce very high purity cyclohexane from a feed stream containing close boiling materials without the necessity of utilizing solvent extraction.

Accordingly it is an object of the invention to provide an improved process for the production of high purity cyclohexane. It is another object of the invention to provide a process for the production of cyclohexane without the necessity of utilizing solvent extraction. Another object of the invention is to provide a process for the production of a cyclohexane stream which can be purified readily by fractional distillation. Still another object of the invention is to provide a simple and economical system for obtaining high purity cyclohexane.

Other objects and advantages of the invention will be apparent from a study of the disclosure, the drawing and the appended claims to the invention.

In accordance with the invention it has been discovered that these objectives can be accomplished and the disadvantages of prior art processes avoided by separating the feed stream to produce a $C_6$ hydrocarbon stream substantially free of materials having a boiling point close to that of cyclohexane, particularly 2,2-dimethylpentane and 2,4-dimethylpentane. Where fractional distillation is utilized to accomplish separation, the division is preferably made at 160° F. such that the $C_6$ hydrocarbon concentrate stream will contain less than 5 volume percent of material boiling above 160° F. The $C_6$ hydrocarbon concentrate stream is then contacted with a suitable dehydrocyclization catalyst in the presence of hydrogen in the dehydrocyclization zone under conditions to convert at least a portion of the $C_6$ hydrocarbons to benzene. The reaction effluent from the dehydrocyclization zone is then contacted with a hydrogenation catalyst in the presence of hydrogen under suitable hydrogenation conditions to convert the benzene to cyclohexane. The effluent from the hydrogenation reaction does not contain any significant quantity of materials boiling within 15° F. of the cyclohexane. Accordingly the hydrogenation reaction effluent can be subjected to simple fractional distillation to produce a cyclohexane product stream of at least 99 volume percent purity. The fractionation of the hydrogenation reaction effluent can be conducted to produce a $C_6$ paraffinic hydrocarbon stream which can be recycled to the dehydrocyclization reaction as a portion of the feed thereto.

Referring now to the drawing there is illustrated a schematic representation of a process in accordance with one embodiment of the invention. A desulfurized hydrocarbon feed stock containing a substantial portion of $C_6$ hydrocarbons is passed through line 11 into fractional distillation zone 12. In general the feed stock can contain hydrocarbons having from 1 to 10 carbon atoms per molecule and more specifically will include hydrocarbons having 5 to 7 carbon atoms per molecule and will include benzene precursors such as normal hexane, 3-methylpentane and 2-methylpentane. Undesirable impurities such as 2,2-dimethylpentane and 2,4-dimethylpentane, which have boiling points close to that of cyclohexane will also be present. Fractional distillation is effected in zone 12 to produce an overhead stream containing n-pentane and lighter boiling components and a bottoms stream containing $C_6$ and heavier hydrocarbons. The bottoms stream from zone 12 is passed through conduit 13 into a second fractional distillation zone 14. Fractional distillation is effected in zone 14 to produce an overhead stream containing components which have boiling points of less than 160° F. In general the overhead stream from zone 14 will contain less than 5 volume percent of material having a boiling point over 160° F. Thus the overhead stream 15 from zone 14 can contain n-hexane, 2-methylpentane and 3-methylpentane while being substantially free of 2,2-dimethylpentane and 2,4-dimethylpentane. The kettle product is withdrawn from zone 14 by way of conduit 16 and will contain components having a boiling point above 160° F. This kettle product may be blended into a gasoline product.

The overhead stream from zone 14 is passed through conduit 15, into and through waste heat exchanger 16 and then into and through furnace 17 to further heat this $C_6$ concentrated stream to a suitable dehydrocyclization temperature. In general this temperature will be in the range of 900° F. to 1100° F. The $C_6$ concentrate stream is passed through conduit 18 into dehydrocyclization zone 19 wherein it is contacted with a suitable dehydrocyclization catalyst in the presence of hydrogen. The hydrogen can be introduced into zone 19 by the passage of hydrogen from conduit 21 through conduit 22 into conduit 15 upstream of preheater 16 and/or through conduit 23 into conduit 15 downstream of preheater 16. Hydrogen is supplied to the dehydrocyclization zone 19 in an amount to provide a hydrogen to hydrocarbon mol ratio in the range of 1:1 to 15:1. The dehydrocyclization zone 19 is maintained under a suitable pressure, for example in the range of 0 to 450 p.s.i.g. Any suitable dehydrocyclization catalyst can be utilized in zone 19, examples of which include molybdenum oxide supported on alumina, and chromium oxide supported on alumina. At least a portion of any 2-methylpentane, 3-methylpentane, and n-hexane present in the feed to zone 19 will be converted to benzene. The feed to zone 19 will generally be sufficient to provide a space velocity in the range of 0.1 to 2 standard cubic feet of vapor feed per cubic foot of catalyst per hour. The reaction effluent is withdrawn from the dehydrocyclization zone 19 and passed through conduit 24 into and through heat exchanger 16 in indirect heat exchange with feed in conduit 15 to cool the reaction effluent. The reaction effluent will generally be cooled to a temperature in the range of 300° F. to 700° F. If necessary additional cooling means can be provided. The thus cooled reaction effluent is passed through conduit 25 into hydrogenation zone 26 wherein it is contacted with a suitable hydrogenation catalyst in the presence of hydrogen. The hydrogen can be provided to hydrogenation zone 26 as a component of the feed and/or by a separate introduction of hydrogen. Hydrogen present in hydrogenation zone 26 will be generally sufficient to provide a hydrogen to hydrocarbon mol ratio in the range of 1:1 to 15:1. Hydrogenation zone 26 will generally be maintained at a temperature in the range of 300° F. to 700° F. and at a pressure of 150 to 450 p.s.i.g. The feed stream can be introduced into the hydrogenation zone to provide a space velocity in the range of 1 to 3 standard cubic feet of vapor material per cubic foot of catalyst per hour. Any suitable hydrogenation catalyst can be used in zone 26, for example nickel supported on kieselguhr. One specific nickel-kieselguhr catalyst contains 20 to 55 weight percent nickel based upon the total catalyst composition. Substantially all benzene contained in zone 26 is converted to cyclohexane.

The reaction effluent is withdrawn from zone 26 and passed by way of conduit 27 into a third fractional distillation zone 28. In the operation of the process with one of the most commonly available $C_6$ feed stocks, the component in the reaction effluent of zone 26 having the boiling point closest to that of cyclohexane will be n-hexane, thus providing approximately a 20° F. differential. This substantial temperature differential permits simple and efficient fractionation of the reaction effluent. In general the fractionation distillation can be effected in zone 28 to provide a hydrogen recycle stream 29, a fuel gas stream 31 which can contain some hydrogen, a LPG stream 32, a pentanes stream 33 and a bottoms stream concentrate consisting essentially of $C_6$ hydrocarbons and containing substantially all of the cyclohexane. The bottoms stream is withdrawn from zone 28 and passed by way of conduit 34 into a fourth fractional distillation zone 35 to separate out the cyclohexane. The bottoms product stream is withdrawn from zone 35 by way of conduit 36 and will contain at least 99 volume percent cyclohexane. If desired the process of the invention can be operated to provide a cyclohexane product stream of at least 99.5 volume percent purity and even as high as 99.9+ volume percent purity. The $C_6$ overhead stream from zone 35 can be withdrawn by way of conduit 37 and recycled to dehydrocyclization zone 19 as a portion of the feed thereto. In one specific process the overhead stream 37 can be introduced into conduit 15 upstream of preheater 16. Makeup hydrogen can be introduced into conduit 29 by way of conduit 39 if required, or conduit 39 can be utilized to remove excess hydrogen.

While fractional distillation zones 28 and 35 have been illustrated as being separated, it is within the contemplation of the invention to utilize a single fractionation column to achieve the desired separation. Similarly fractional distillation zone 28 can contain a single fractionation column or a plurality of fractionation columns. Zones 19 and 26 can each comprise individual reactors or a plurality of reactors in series or parallel.

The following example is presented in further illustration of the invention and should not be construed to unduly limit the invention.

In a process represented by the schematic illustration in the drawing, dehydrocyclization zone 19 is operated at a pressure of 405 p.s.i.g. and at a temperature of 1000° F. Zone 19 contains a catalyst of molybdenum oxide supported on alumina with the molybdenum oxide being present in an amount of 10 weight percent based upon the total catalyst composition. Hydrogen is introduced into zone 19 to provide a hydrogen to hydrocarbon mol ratio of approximately 6:1. The space velocity through zone 19 is on the order of 1 standard cubic foot of vaporous feed per cubic foot of catalyst per hour.

Hydrogenation zone 26 contains a nickel on kieselguhr catalyst with the nickel being present in an amount of 30 weight percent based upon total catalyst composition. Zone 26 is maintained at a pressure of 400 p.s.i.g. and a temperature of 400° F. Hydrogen is introduced into zone 26 to provide a hydrogen to hydrocarbon mol ratio on the order of 7:1 (a portion of the hydrogen being generated in zone 19) while the space velocity is on the order of 1.5 cubic feet of feed per cubic foot of catalyst per hour.

Fractional distillation zone 35 is operated with an overhead pressure of 45 p.s.i.g., an overhead temperature of 244° F., a bottom pressure of 54 p.s.i.g., and a bottom temperature of 294° F.

The composition of the various streams (not including hydrogen) is set forth in Table I wherein the quantities of flow are expressed in barrels per day.

TABLE I

| Component Stream | Normal boiling point, °F. | 11 | 15 | 37 | 18 | 24 | 27 | 34 | 36 |
|---|---|---|---|---|---|---|---|---|---|
| $C_5$ and lighter | | 105 | Trace | | 110 | | 161 | 161 | | |
| 2,2-dimethylbutane | 121.5 | 14 | 12 | 110 | 122 | 201 | 201 | 110 | |
| 2,3-dimethylbutane | 136.4 | 31 | 31 | 60 | 91 | 110 | 110 | 60 | |
| 2-methylpentane | 140.5 | 270 | 270 | 175 | 445 | 320 | 320 | 175 | |
| 3-methylpentane | 145.9 | 162 | 162 | 79 | 241 | 145 | 145 | 79 | |
| Normal hexane | 155.7 | 490 | 490 | 192 | 682 | 199 | 199 | 192 | |
| Methylcyclopentane | 161.3 | 115 | 15 | Trace | 15 | Trace | Trace | Trace | |
| Benzene | 176.2 | 128 | 18 | Trace | 18 | 309 | Trace | Trace | |
| Cyclohexane | 177.3 | 42 | 2 | | 2 | | 376 | 376 | 376 |
| Light Isoheptanes [1] | 174.6 177.6 | 18 | [1] Trace | | | | | | |
| Heavier hydrocarbons [2] | | 225 | | | | | | | |
| Total | | 1,600 | 1,000 | 616 | 1,616 | 1,445 | 1,512 | 992 | [3] 376 |

[1] 2,2-dimethylpentane and 2,4-dimethylpentane.
[2] Up to $C_{10}$ hydrocarbons.
[3] 99.9+% purity cyclohexane.

Thus a cyclohexane product stream of greater than 99 volume percent purity is obtained from a feed stock containing 2,2-dimethylpentane and 2,4 - dimethylpentane without the necessity of using solvent extraction.

Reasonable variations and modifications are possible within the scope of the foregoing disclosure, the drawing and the appended claims to the invention.

We claim:
1. A method of producing a cyclohexane product stream having a purity of at least 99 volume percent from a feedstream containing $C_5$ to $C_7$ hydrocarbons, including 2,2-dimethylpentane and 2,4-dimethylpentane, without incurring the necessity of solvent extraction, which comprises fractionating said feedstream to produce a $C_6$ concentrate stream containing less than 5 volume percent of material boiling above 160° F. and being substantially free of 2,2-dimethylpentane and 2,4-dimethylpentane, heating said concentrate stream to a temperature in the range of 900° F. to 1100° F., contacting the thus heated concentrate stream with a suitable dehydrocyclization catalyst in the presence of hydrogen in a dehydrocyclization zone at a pressure in the range of 0 to 450 p.s.i.g. to convert a portion of the $C_6$ hydrocarbons into benzene, withdrawing the reaction effluent from said dehydrocyclization zone, cooling the thus withdrawn reaction effluent to a temperature in the range of 300° F. to 700° F., contacting the thus cooled reaction effluent with a suitable hydrogenation catalyst in the presence of hydrogen in a hydrogenation zone at a pressure in the range of 150 to 450 p.s.i.g. to convert the benzene to cyclohexane, withdrawing the reaction effluent from said hydrogenation zone, fractionally distilling the thus withdrawn hydrogenation reaction effluent to provide a cyclohexane stream containing at least 99 volume percent cyclohexane.

2. A method of producing a cyclohexane product stream containing at least 99.5 volume percent cyclohexane from a feedstream containing $C_5$ to $C_7$ hydrocarbons including n-hexane, 2-methylpentane, 3-methylpentane, methylcyclopentane, benzene, cyclohexane, 2,2-dimethylpentane and 2,4-dimethylpentane, without the necessity of solvent extraction, which comprises fractionating said feedstream in a first fractional distillation zone to produce an overhead stream containing normal pentane and lighter boiling materials and a $C_6+$ bottoms stream, fractionally distilling said bottoms stream in a second fractional distillation zone to produce a kettle stream containing components of said bottoms stream which boil above 160° F. and a $C_6$ overhead stream containing n-hexane, 2-methylpentane and 3-methylpentane and being substantially free of 2,2-dimethylpentane and 2,4-dimethylpentane, heating said $C_6$ overhead stream to a temperature in the range of 900° F. to 1100° F., contacting the thus heated $C_6$ overhead stream with a suitable dehydrocyclization catalyst in the presence of hydrogen in a dehydrocyclization zone at a pressure in the range of 0 to 450 p.s.i.g. to convert a portion of the $C_6$ hydrocarbon to benzene, withdrawing the reaction effluent from said dehydrocyclization zone, cooling the thus withdrawn reaction effluent to a temperature in the range of 300° F. to 700° F., contacting the thus cooled reaction effluent with a suitable hydrogenation catalyst in the presence of hydrogen in a hydrogenation zone at a pressure in the range of 150 to 450 p.s.i.g. to convert the benzene to cyclohexane, withdrawing the reaction effluent from said hydrogenation zone, fractionally distilling the thus withdrawn hydrogenation reaction effluent in a third fractional distillation zone to produce a bottoms stream consisting essentially of $C_6$ hydrocarbon and containing substantially all of the cyclohexane produced in said hydrogenation zone, fractionally distilling said bottoms stream from said third fractional distillation zone in a fourth fractional distillation zone to produce a bottoms product stream containing at least 99.5 volume percent cyclohexane and an overhead stream, and passing the overhead stream from said fourth fractional distillation zone to said dehydrocyclization zone as a portion of the feed thereto.

3. A method of producing a high purity cyclohexane stream from a feedstream containing $C_6$ hydrocarbons, 2,2-dimethylpentane and 2,4-dimethylpentane which comprises separating said feedstream to produce a $C_6$ concentrate stream substantially free of 2,2-dimethylpentane and 2,4-dimethylpentane; contacting said concentrate stream with a suitable dehydrocyclization catalyst under dehydrocyclization conditions in a dehydrocyclization zone to produce benzene; withdrawing the reaction effluent from said dehydrocyclization zone; contacting the thus withdrawn reaction effluent with a hydrogenation catalyst in the presence of hydrogen under hydrogenation conditions to convert the benzene to cyclohexane; withdrawing the reaction effluent from said hydrogenation zone; and fractionally distilling the thus withdrawn hydrogenation reaction effluent to provide a high purity cyclohexane stream, said dehydrocyclization conditions comprising a temperature in the range of 900° F. to 1100° F., a pressure in the range of 0 to 450 p.s.i.g., a hydrogen to hydrocarbon mol ratio in the range of 1:1 to 15:1, and a space velocity in the range of 0.1 to 2 cubic feet of feed per cubic foot of catalyst per hour; said hydrogenation conditions comprising a temperature in the range of 300° F. to 700° F., a pressure in the range of 150 to 450 p.s.i.g., a hydrogen to hydrocarbon ratio in the range of 1:1 to 15:1, and a space velocity in the range of 1 to 3 cubic feet of feed per cubic foot of catalyst per hour.

4. A method according to claim 3 wherein said feedstream comprises 2,2-dimethylbutane, 2,3-dimethylbutane, 2 - methylpentane, 3-methylpentane, n-hexane, methylcyclopentane, benzene, cyclohexane, 2,2-dimethylpentane and 2,4-dimethylpentane.

5. A method according to claim 3 wherein said concentrate stream contains less than 5 volume percent of material having a boiling point above 160° F.

References Cited by the Examiner
UNITED STATES PATENTS
3,150,195   9/1964   Findlay _____ 260—666

DELBERT E. GANTZ, *Primary Examiner.*

V. O'KEEFE, *Assistant Examiner.*